H. E. STONEBRAKER.
FRICTION GEARING FOR MOTOR VEHICLES.
APPLICATION FILED NOV. 29, 1918.
1,328,346.
Patented Jan. 20, 1920.
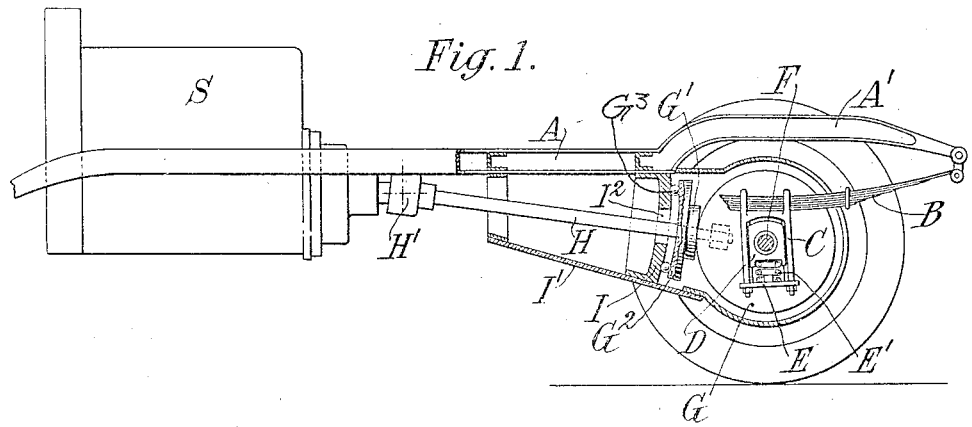
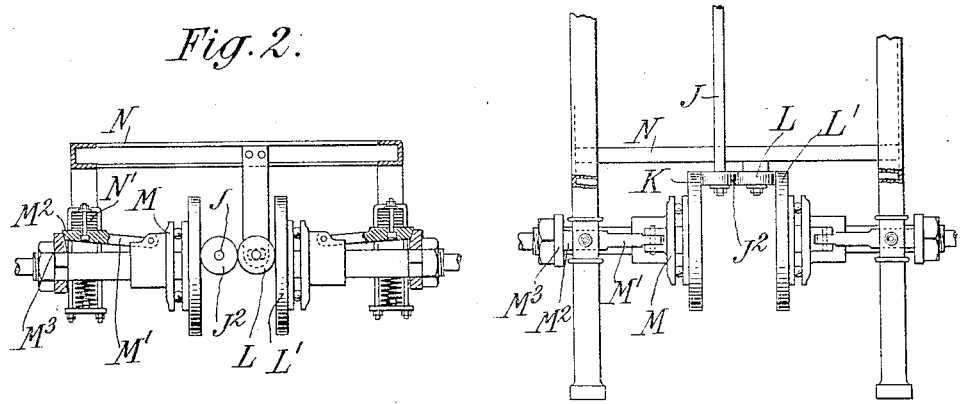
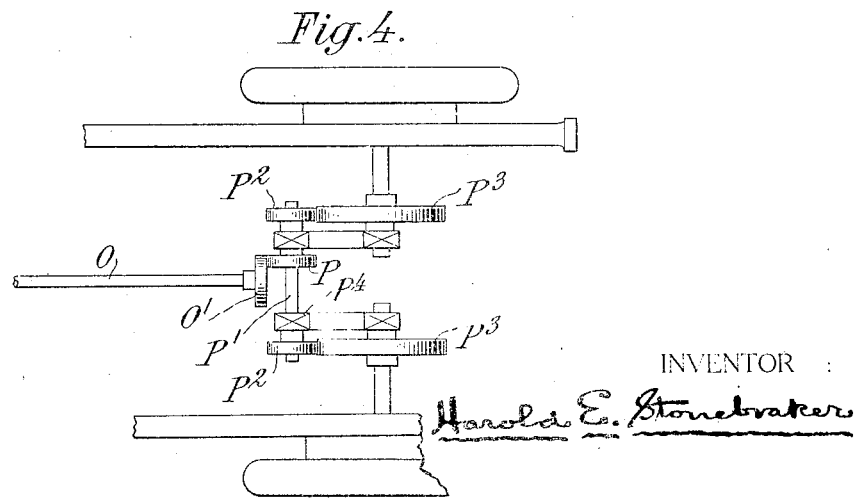
INVENTOR
Harold E. Stonebraker

UNITED STATES PATENT OFFICE.

HAROLD E. STONEBRAKER, OF BROOKLYN, NEW YORK.

FRICTION-GEARING FOR MOTOR-VEHICLES.

1,328,346.  Specification of Letters Patent.  Patented Jan. 20, 1920.

Application filed November 29, 1918. Serial No. 264,619.

*To all whom it may concern:*

Be it known that I, HAROLD E. STONE-BRAKER, a citizen of the United States of America, residing in borough of Brooklyn, county of Kings, city and State of New York, have invented certain new and useful Improvements in Friction-Gearing for Motor-Vehicles, of which the following is a specification.

This invention relates to a friction gearing for motor vehicles and it has for its particular purpose to provide a practical and economical friction drive between the power transmission shaft and the rear axle or other driven element of a vehicle.

The purpose is to eliminate toothed gearing as far as possible, thereby lessening the manufacturing cost and reducing the noise incidental to the operation of the gears.

The particular object of the improvement is to afford an arrangement whereby a friction drive for a vehicle can be made reasonably small in size, so as to bring it within practical requirements, and at the same time obtain the necessary amount of pressure between the members of the friction pair.

As the power to be transmitted, and the tendency to slippage between the members of the friction pair, varies with changes in speed of the vehicle, a further object of the invention is to automatically vary the pressure between the members of the friction pair, so that the greatest pressure is exerted to hold them together when the vehicle is not in motion, and the amount of pressure exerted decreases as the speed of the vehicle is increased.

In general, the invention consists in utilizing the weight of the chassis and body of a vehicle to exert the required pressure between the friction members. This can be accomplished by arranging the rear axle, or the driven member of the friction pair, so that it is movable bodily, for instance, forwardly, with reference to the vehicle chassis, such forward movement being effected by the downwardly acting weight of the chassis and the parts which it carries. As the vehicle increases in speed, the downwardly acting effect of the weight of the chassis decreases by reason of its forward movement, and thus the friction members are held together with less pressure, but sufficiently to transmit the necessary power. A sudden increase in the speed will produce a more or less corresponding decrease of pressure between the friction members, so that the conditions under which the power is transmitted are varied to accord properly with the speed of the vehicle.

There are, perhaps, numberless ways in which the fundamental idea of the invention can be carried out, and for purposes of illustration, three possible forms are here shown, the drawings being largely diagrammatic and omitting, in large part, the usual and conventional detail parts necessary to properly mounting the movable shafts and similar parts, all of which is well within the practices of good automobile mechanics and is unnecessary to a disclosure of this invention.

Figure 1 is a longitudinal, vertical, sectional view of an automobile chassis and rear axle, showing the application of one form of the invention, and with the forward part of the chassis broken away;

Fig. 2 is a transverse, vertical, sectional view of a chassis and rear axle, illustrating a modified arrangement;

Fig. 3 is a plan view of the parts shown in Fig. 2, and

Fig. 4 is a plan view of a further modification.

Referring more particularly to Fig. 1, A designates the chassis or frame of the usual type of automobile having the rear portions A' to which are connected the springs B. The springs B are mounted upon boxes or housings C, which include guideways or socket portions that are inclined to a vertical plane, as shown in Fig. 1. These guideways of the boxes C coöperates with blocks D which are suitably mounted upon the rear axle. The weight of the chassis forces the boxes C downwardly, and any sudden or abnormal upward movement of the chassis, with reference to the blocks D, is prevented by providing the boxes C with caps E at their lower ends, and locating springs E' between said caps and the underside of the blocks D. By reason of the vertically inclined arrangement of the guideways or socket portions in the boxes C, the latter are moved forwardly with reference to the chassis as the latter acts downwardly, and at the same time the axle F is also carried forwardly for a purpose, and to the extent which will now appear.

The axle F may be provided with the usual differential housing which may include the driven member, or friction gear G, and the latter is driven by engagement with a friction driving member or pinion G′ which is mounted upon the transmission shaft H, the latter extending to the usual universal housing H′ and operated by the motion of engine S. The front edge of the gear G engages the rear face of the gear G′, as shown in Fig. 1, the gear G being forced with sufficient pressure against the gear G′ by the action of the parts already described. To hold the friction members together, it is necessary to retain the pinion G′ against forward movement, and to this end the latter is held by a support I, which is rigidly attached to the chassis and retained by suitable bracing members I′. It is necessary to provide for a limited amount of relative vertical motion between the pinion G′ and the support I, owing to the up and down movements of the chassis, and to accomplish this the pinion G′ is mounted upon a base $G^2$, the front face of which is curved substantially in the arc of a circle about which the chassis would move with reference to the pinion G′. The support I is correspondingly curved, and is cut away at $I^2$ to permit said relative movement. Suitable ball or roller bearings $G^3$ may be arranged between the support I and the base $G^2$ of pinion G′, to permit the relative movement just referred to.

The friction gear G′ or driving member, may be keyed upon the transmission shaft H, to permit slight longitudinal motion thereon, and the shaft H may extend beyond the gear G′ and have its rear end mounted in a suitable bearing supported by the rear axle.

Referring now to Figs. 2 and 3, there is here illustrated a modification intended to permit of adapting friction driving means to both ends of the rear axle and thus eliminating any differential mechanism, such as is now commonly used. In this form, the transmission shaft J carries a friction driving pinion $J^2$ at its rear end, and its edge engages upon one side, the inner face of a friction gear K, and on the other side a slidable friction idler L, which in turn engages the inner face of a friction gear L′. The gears K and L′ are mounted respectively on the two ends of the axle, for driving the rear wheels independently, and it is necessary to force the friction gears K and L′ toward the driving gear $J^2$, in order to obtain the necessary pressure for transmitting power. To accomplish this, the gears K and L′ are engaged by followers M, slidable upon the axle. Each follower M carries a pivoted actuating lever M′, the outer end of which is inclined as at $M^2$ and engages a correspondingly inclined surface $M^3$ mounted upon the axle. The chassis N is mounted upon the actuating levers M′, through the intermediate springs N′, which are of usual construction, and are attached fixedly to the levers M′. The weight of the chassis forces the outer ends of the levers M′ downwardly, and this in turn, by reason of the inclined face $M^2$ and $M^3$, actuates the followers M inwardly, toward each other and toward the friction driving member $J^2$.

Fig. 4 illustrates another form of mechanism for accomplishing the same purpose as that just described. In this case, however, it is intended that the rear axle shall have a forward movement bodily, with reference to the chassis, as in Fig. 1, instead of arranging it as in Figs. 2 and 3, where no such forward movement is required. In general, the structure of Fig. 1 may be followed, and the only difference lies in the arrangement of gearing, in order to eliminate the differential gearing. O designates the transmission shaft and O′ is the friction driving gear which engages the friction gear P fixed on the jack-shaft P′. The jack-shaft also carries friction gears $P^2$ which engage friction driven gears $P^3$ mounted respectively upon the opposite ends of the rear axle. With this form of apparatus, it will be understood that the jack-shaft P′ will be mounted and slidable bodily in suitable bearings supported by the rear axle and designated generally at $P^4$, so that the forward actuation of the rear axle, due to the downwardly acting weight of the chassis, will force the gears $P^3$ tightly against gears $P^2$ and also the gear P tightly against gear O′. The gear O′ will be held against forward movement similarly as in Fig. 1, or by other suitable convenient means, and the jack-shaft, with the gears which it carries, will be freely movable bodily, and held with the proper degree of pressure by the action of the rear axle already described.

The term "vehicle" as used throughout the specification and claims is intended to refer to bicycles and motor-cycles, as well as any and all types of automobiles and motor-driven tractors and trucks, or wherever a friction pair can be employed between the driving and driven elements of a traveling carriage. The particular forms of the apparatus that are here disclosed are intended merely to illustrate adaptations of the idea, and the invention is to be in no way limited to such structures. This application is intended to cover any modifications, changes, or other applications of the improvements, which may come within the purposes and principles described, and the scope of the following claims.

What I claim is:—

1. In a vehicle, the combination with frictionally engaging driving and driven members, of means controlled by the speed of the vehicle for pressing said frictional members together.

2. In a vehicle, the combination with frictionally engaging driving and driven members, of means whereby the friction members are forced together under greatest pressure when the vehicle is motionless, and under least pressure when the vehicle is traveling at maximum speed.

3. In a vehicle, the combination with frictionally engaging driving and driven members, of means controlled by the weight of a part of the vehicle for actuating said friction members together, whereby the pressure of one against the other decreases as the speed of the vehicle increases.

4. In a vehicle, the combination with driving and driven members in frictional engagement with each other, of gravity controlled means acting to force said friction members together.

5. In a vehicle, the combination with a frame and driving and driven members in frictional engagement with each other, of means actuated by the weight of said frame and forcing said friction members together.

6. In a motor-driven vehicle, the combination with a frame, a motor, a driving member operated by the motor, and a driven member frictionally engaging said driving member, the weight of the frame acting to force one of said friction members into engagement with the other.

7. In a motor-driven vehicle, the combination with a frame and a motor mounted thereon, a driving member operated by the motor, and a driven member frictionally engaging the driving member, one of said frictional members being movable bodily toward the other and held in engagement therewith by the weight of the frame and motor.

8. In a motor-driven vehicle, the combination with a frame, of a motor and a driving member, of an axle and a driven member associated therewith, the driven and driving members having frictional engagement and one movable bodily toward the other and actuated by the weight of the frame.

9. In a motor-driven vehicle, the combination with a frame, of a motor and a driving member, of an axle, a driven member associated with the axle and frictionally engaging said driving member, the axle and driven member being movable bodily toward the driving member and held in operative position by the weight of the frame.

10. In a motor vehicle, the combination with an axle and a driven member associated therewith, of a frame, a motor, and a driving member in frictional engagement with said driven member, the frame being movable downwardly with reference to the axle and acting through such movement to maintain said friction members engaged under a pressure varying inversely with the speed of the vehicle.

In witness whereof I have hereunto signed my name.

HAROLD E. STONEBRAKER.